(12) United States Patent
Tajima et al.

(10) Patent No.: US 10,232,684 B2
(45) Date of Patent: Mar. 19, 2019

(54) CARBON DIOXIDE CONCENTRATION CONTROL DEVICE AND APPARATUS

(71) Applicant: SHARP KABUSHIKI KAISHA, Sakai, Osaka (JP)

(72) Inventors: Hideharu Tajima, Sakai (JP); Takayuki Naka, Sakai (JP); Hirohisa Yamada, Sakai (JP); Masaki Yamamoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 113 days.

(21) Appl. No.: 15/312,014

(22) PCT Filed: May 14, 2015

(86) PCT No.: PCT/JP2015/063940
§ 371 (c)(1),
(2) Date: Nov. 17, 2016

(87) PCT Pub. No.: WO2015/182402
PCT Pub. Date: Dec. 3, 2015

(65) Prior Publication Data
US 2017/0087963 A1  Mar. 30, 2017

(30) Foreign Application Priority Data

May 30, 2014  (JP) .................. 2014-113455

(51) Int. Cl.
*B01D 53/02* (2006.01)
*B60H 3/06* (2006.01)
(Continued)

(52) U.S. Cl.
CPC ........... *B60H 3/06* (2013.01); *B01D 53/0415* (2013.01); *B01D 53/0462* (2013.01);
(Continued)

(58) Field of Classification Search
CPC ........ B01D 2252/204; B01D 2257/504; B01D 53/0462; B01D 53/1412; B01D 53/1425;
(Continued)

(56) References Cited

U.S. PATENT DOCUMENTS

| 6,199,397 B1 | 3/2001 | Khelifa et al. | |
| 2003/0232722 A1* | 12/2003 | Kato | B01D 53/02 502/411 |
| 2013/0139695 A1* | 6/2013 | Chang | B01D 53/1475 96/235 |

FOREIGN PATENT DOCUMENTS

| JP | 11-019449 | 1/1999 |
| JP | 2000-107545 | 4/2000 |

(Continued)

OTHER PUBLICATIONS

Translation of JP2004/203367, (Year: 2004).*
International Search Report for PCT/JP2015/063940, dated Aug. 4, 2015, 4 pages.

*Primary Examiner* — Christopher P Jones
(74) *Attorney, Agent, or Firm* — ScienBiziP, P.C.

(57) ABSTRACT

A carbon dioxide concentration control device (10) is provided with a control unit (15) that controls an absorption amount of carbon dioxide of a carbon dioxide absorbent (16) per unit hour, and a regeneration control unit (14) that generates the carbon dioxide absorbent (16), and a second drive energy supply unit (13) which is different from a first drive energy supply unit (11) that supplies power to the control unit (15) supplies power to the regeneration control unit (14), and thus a carbon dioxide concentration in a space is controlled to be an appropriate value for long periods of time.

7 Claims, 10 Drawing Sheets

(51) Int. Cl.
  *B01D 53/04* (2006.01)
  *B01D 53/14* (2006.01)
(52) U.S. Cl.
  CPC ..... *B01D 53/1412* (2013.01); *B01D 53/1425* (2013.01); *B01D 53/1475* (2013.01); *B01D 53/1493* (2013.01); *B60H 3/0633* (2013.01); *B60H 3/0658* (2013.01); *B01D 2252/204* (2013.01); *B01D 2253/10* (2013.01); *B01D 2257/504* (2013.01); *B01D 2259/4566* (2013.01); *B60H 2003/065* (2013.01); *B60H 2003/0683* (2013.01); *B60H 2003/0691* (2013.01); *Y02C 10/06* (2013.01)
(58) Field of Classification Search
  CPC ............ B01D 53/1475; B01D 53/1493; B60H 2003/065; B60H 2003/0683; B60H 3/06; B60H 3/0633
  See application file for complete search history.

(56) References Cited

FOREIGN PATENT DOCUMENTS

| | | |
|---|---|---|
| JP | 2000-127756 | 5/2000 |
| JP | 2004-203367 | 7/2004 |
| JP | 2008-30698 | 2/2008 |

\* cited by examiner

CARBON DIOXIDE CONCENTRATION CONTROL DEVICE AND APPARATUS

This application is the U.S. national phase of International Application No. PCT/JP2015/063940 filed 14 May 2015, which designated the U.S. and claims priority to JP Patent Application No. 2014-113455 filed 30 May 2014, the entire contents of each of which are hereby incorporated by reference.

TECHNICAL FIELD

The present invention relates to a technique for controlling a carbon dioxide concentration.

BACKGROUND ART

In recent years, in order to efficiently use an air conditioner for environmental pollution measures and power saving, a need for limitation of the air in a room has increased. For example, in order to prevent allergens such as toxic gas contained in the outside air, dust contained in an exhaust gas of an automobile and the like, fine particulate matters (PM 2.5), and pollen from entering a room, a need for ventilation and circulation of the air in the room has increased. In addition, in a case where a temperature in the room is adjusted by the air conditioner or the like, in order to save power consumption, it is desired that the ventilation is performed by using (circulating) the air in the room instead of using the outside air as it is.

On the other hand, human beings inhale oxygen in the air by respiration, and exhale exhalation gas containing a large amount of carbon dioxide. In a case where the volume of an enclosed space is small (that is, the space is narrow), and a density of people present in the enclosed space is high, a carbon dioxide concentration in the space is increased. However, the carbon dioxide is a colorless and odorless gas, and thus it is difficult to recognize that the concentration of the carbon dioxide is increased. Therefore, it is important to properly control the carbon dioxide concentration.

Regarding a state where the carbon dioxide concentration in the space is rapidly increased when the above-described ventilation limiting of the enclosed space is performed by using the air in the enclosed space, an example of a change of the carbon dioxide concentration over time in a case where one adult and two children are present in a compartment of an automobile is illustrated in FIG. 11. FIG. 11 is a graph illustrating an example of a result obtained by measuring the change of the carbon dioxide concentration in a compartment of a vehicle over time in a case where total three people of one adult and two children ride in a compartment of a light-weight vehicle (a light-weight wagon). In a case where the ventilation is performed through the air from the outside of the compartment by opening a window (graph P2), even after the lapse of 20 minutes, the carbon dioxide concentration in the compartment is approximately 500 ppm, and an increase in the carbon dioxide concentration was not found. On the other hand, in a case where only the air in the compartment was circulated by closing windows and doors (graph P1), the level of the carbon dioxide concentration in the compartment exceeded 1000 ppm in five minutes, and approached up to 5000 ppm in 50 minutes. A carbon dioxide concentration C2 at 1000 ppm is a concentration (an upper limit value regulated in Buildings and Health Act) which has been known for a bad influence on a human body such as loss of concentration and inducement of sleepiness. In addition, a carbon dioxide concentration C1 at 5000 ppm is a concentration set as an allowable concentration (a recommendation value of the Japan Society for Occupational Health) of the chemical Material Safety Data Sheet (MSDS).

As such, it has been known that in the enclosed space such as the inside of the compartment of the vehicle, the carbon dioxide concentration in the space is rapidly increased. For example, PTL 1 discloses an air conditioning system for a vehicle in which a selective separating material having a function for permeating oxygen and carbon dioxide in a space, and shielding hydrocarbon, nitrogen oxide, sulfur oxide, and microsolid components is arranged so as to separate the inside from the outside of the compartment of the vehicle.

CITATION LIST

Patent Literature

PTL 1: Japanese Unexamined Patent Application Publication No. 2008-30698 (Publication date: Feb. 14, 2008)

SUMMARY OF INVENTION

Technical Problem

However, in the related art as described above has a problem in that there is a need to restructure the entire structure of the vehicle, and thus the related art is not easily applicable to the existing vehicle. For example, the air conditioning system for a vehicle disclosed in PTL 1 prevents toxic gases and toxic particles from entering the compartment of the vehicle, and constantly maintains the concentration of oxygen and carbon dioxide in the compartment of the vehicle; on the other hand, the air conditioning system for a vehicle also forms a space in the compartment of the vehicle with a floorboard and an outer plate, and thus there is a need to provide an inside air intake port and an inside air discharge port on the floorboard, and an outside air intake port and an outside air discharge port on the outer plate.

The present invention has been made in view of the relevant problem, and an object of the present invention is to realize a carbon dioxide concentration control device or the like which can be easily applied to an enclosed space, and can control a carbon dioxide concentration in the air of the inside of the enclosed space to be appropriate value for long periods of time.

Solution to Problem

In order to solve the above-described problems, according to an aspect of the present invention, there is provided a carbon dioxide concentration control device. The carbon dioxide concentration control device is a portable-type carbon dioxide concentration control device which controls a carbon dioxide concentration contained in air in a target space, in which the carbon dioxide concentration is controlled, by using an absorbent which is capable of controlling an absorbing rate of carbon dioxide, including a detecting unit that detects the carbon dioxide concentration; a control unit that controls absorbing rate of the absorbent; a regeneration unit that regenerates the absorbent by discharging the carbon dioxide absorbed by the absorbent from the absorbent; a first power supply unit that supplies power for driving the detecting unit and the control unit from a first power supply source; and a second power supply unit that supplies power for driving the regeneration unit from a second power supply source which is different from the first power supply source.

Advantageous Effects of Invention

According to the aspect of the present invention, the carbon dioxide concentration control device exhibits an effect of controlling the carbon dioxide concentration in the air of the inside of the target space, in which the carbon dioxide concentration is controlled, to be an appropriate value for long periods of time without a need to restructure the configuration of the vehicle.

DESCRIPTION OF EMBODIMENTS

Embodiment 1

Figure 1:
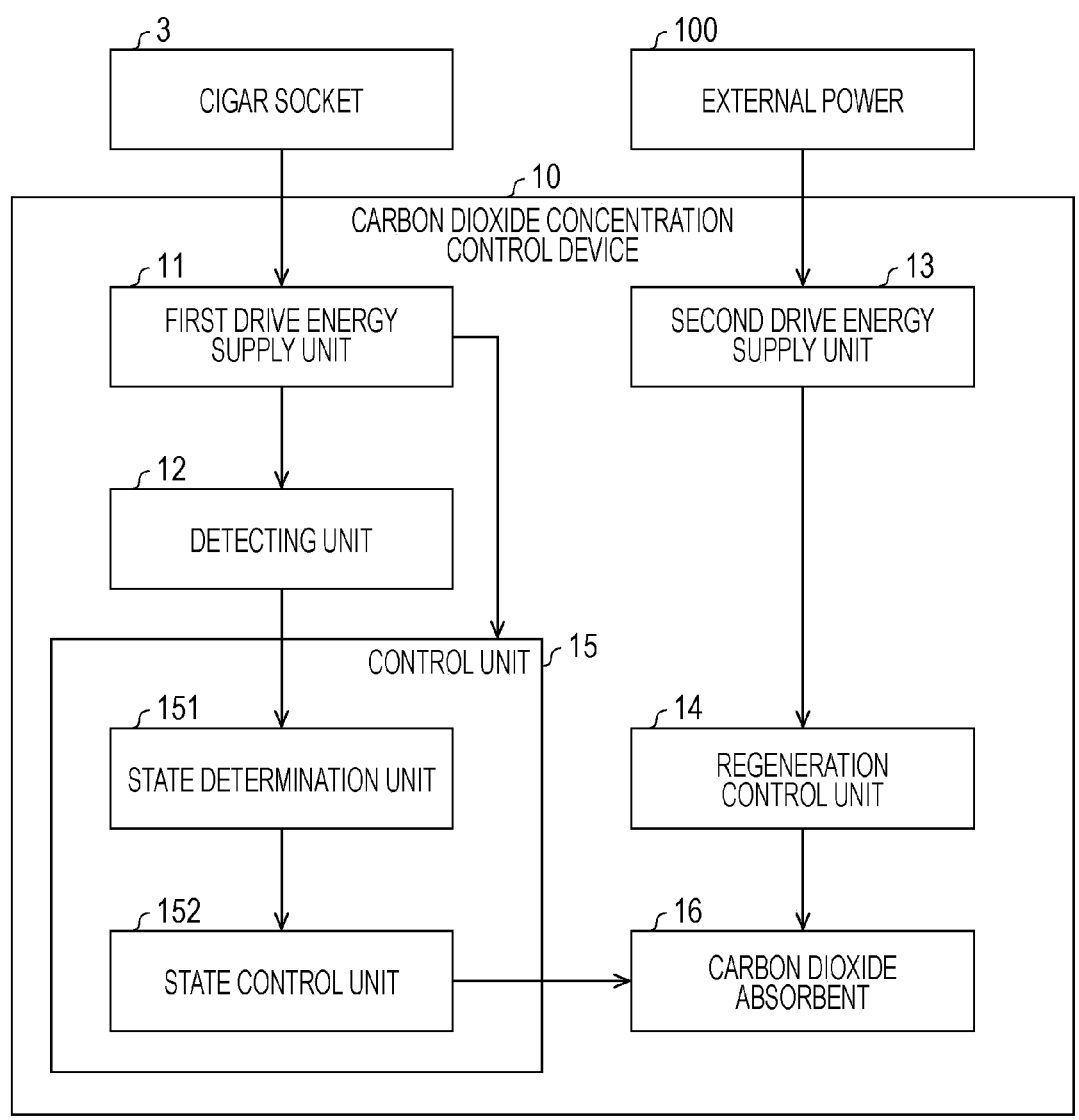
FIG. 1 is a diagram schematically illustrating a configuration example of a carbon dioxide concentration control device according to Embodiment 1 of the present invention.
Figure 2:
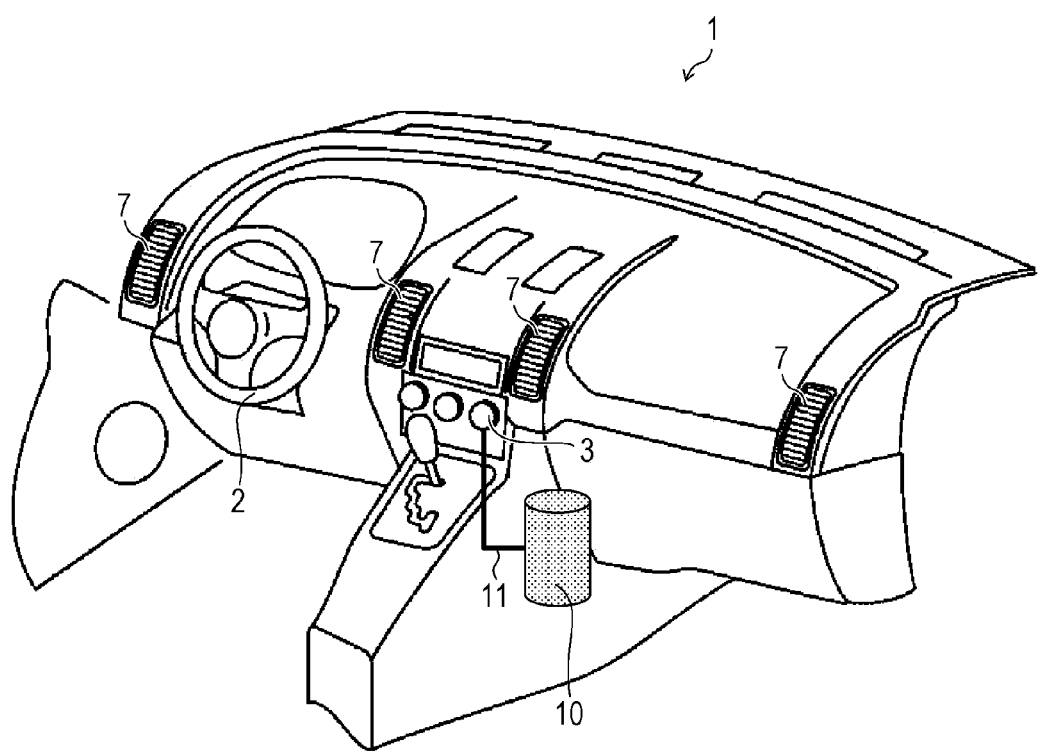
FIG. 2 is a diagram illustrating an example of a case where the carbon dioxide concentration control device is installed in a compartment of a vehicle.

An outline of a portable-type carbon dioxide concentration control device 10 in a first embodiment of the present invention will be described based on FIG. 1 and FIG. 2, as follows. Here, the "portable-type" means that (1) it is easy to install the device (can be mounted by a general user) in a control target space in which a carbon dioxide concentration is controlled by the carbon dioxide concentration control device 10, and (2) a portion including at least a carbon dioxide absorbent 16 is easily detached from the control target space in which the carbon dioxide concentration is controlled. FIG. 1 is a diagram schematically illustrating a configuration example of the carbon dioxide concentration control device according to Embodiment 1 of the present invention. In addition, FIG. 2 is a diagram illustrating an example of a case where the carbon dioxide concentration control device 10 in FIG. 1 is installed in a compartment of a vehicle (apparatus). Note that, FIG. 1 and FIG. 2 only illustrate main components such as the carbon dioxide concentration control device 10, and other components which are not directly related to the present invention are not illustrated for the sake of convenience of description.

(Configuration of Carbon Dioxide Concentration Control Device 10)

As illustrated in FIG. 1, the carbon dioxide concentration control device 10 is provided with a first drive energy supply unit (a first power supply unit) 11, a detecting unit (a detecting unit) 12, a second drive energy supply unit (a second power supply unit) 13, a regeneration control unit (a regeneration unit) 14, a control unit 15, and a carbon dioxide absorbent 16. Although not illustrated in FIG. 1, the carbon dioxide concentration control device 10 may be provided with a pump and a fan so as to take the air into the detecting unit 12 and the carbon dioxide absorbent 16.

The first drive energy supply unit 11 includes a cigar socket adaptor and a transformer so as to supply the power supplied from a cigar socket (a first power supply source) 3 to the detecting unit 12 and the control unit 15. Note that, the first drive energy supply unit 11 is not limited to power supply from the cigar socket 3. The first drive energy supply unit 11 may be configured to supply the power from a primary battery such as a dry cell or a secondary battery such as a lithium-ion battery to the carbon dioxide concentration control device 10, or may be configured to appropriately supply the power from any existing energy source that can be used in the compartment of the vehicle to the carbon dioxide concentration control device 10. That is, the cigar socket 3 is merely an example of a power source for supplying the power from the first drive energy supply unit 11 to the carbon dioxide concentration control device 10.

The detecting unit 12 includes a carbon dioxide sensor for detecting the carbon dioxide concentration in a gas. The detecting unit 12 is not limited to the carbon dioxide sensor, and may include an infrared-type carbon dioxide sensor and a solid electrolyte-type carbon dioxide sensor. The detecting unit 12 measures the carbon dioxide concentration in the compartment of the vehicle and outputs the measuring result to the control unit 15.

The control unit 15 controls the entire carbon dioxide concentration control device 10. In detail, the control unit 15 receives information on the carbon dioxide concentration measured by the detecting unit 12, and controls a state of the carbon dioxide absorbent 16 in accordance with the information so as to appropriately control the absorbing rate of carbon dioxide by the carbon dioxide absorbent 16. The control unit 15 is provided with a state determination unit 151 and a state control unit 152. Note that, examples of the carbon dioxide absorbent 16 which can control the absorbing rate of the carbon dioxide by the control unit 15 include a lithium-based composite oxide having the following properties of (1) to (3): (1) a large absorption amount of carbon dioxide per unit weight, (2) a large absorption amount of carbon dioxide per unit hour (that is, the high absorbing rate of the carbon dioxide), and (3) a change of the absorbing rate of the carbon dioxide depending on the temperature; however, the carbon dioxide absorbent 16 is not limited thereto. The carbon dioxide absorbent 16 will be specifically described later.

The state determination unit 151 obtains the carbon dioxide concentration measured by the detecting unit 12, compares the measured carbon dioxide concentration and a previously set value of the carbon dioxide concentration, determines whether or not the measured carbon dioxide concentration is equal to or less than the set value, and then determines a temperature to which the carbon dioxide absorbent 16 is to be controlled from the determination result. In detail, in a case where the measured carbon dioxide concentration is equal to or less than the set value, the state determination unit 151 determines the temperature of the carbon dioxide absorbent 16 as a temperature in which the absorption amount of carbon dioxide per unit hour becomes a lower limit amount of the device. On the other hand, in a case where the measured carbon dioxide concentration is greater than the set value, the state determination unit 151 determines the temperature of the carbon dioxide absorbent 16 as a temperature in which the absorption amount of carbon dioxide of the carbon dioxide absorbent 16 per unit hour becomes greater than the lower limit amount of the device. Here, the lower limit amount of the device means a lower limit amount which can be set by the carbon dioxide concentration control device 10. The determines temperature, that is, the information (temperature) indicating the temperature to which the carbon dioxide absorbent 16 is to be controlled is output to the state control unit 152.

Note that, the above-described "lower limit amount which can be set by the carbon dioxide concentration control device 10" is the lower limit absorption amount of carbon dioxide which is realized by controlling the temperature of the carbon dioxide absorbent 16, and which can be set by the carbon dioxide concentration control device 10 per unit hour. Also, it is smaller than the maximum amount of the absorption amount of carbon dioxide the per unit hour. Hereinafter, the "lower limit amount which can be set by the carbon dioxide concentration control device 10" is simply referred to as a "lower limit amount of the device". Note that, the "lower limit amount of the device" may be, for example, a lower limit absorption amount of carbon dioxide of the carbon dioxide absorbent 16 per unit hour in a temperature range in which the state control unit 152 can be controlled.

Meanwhile, in a case where the temperature of the carbon dioxide absorbent 16 is in a predetermined range (for example, the same temperature as the surrounding temperature), the lower limit amount of the device indicates the "substantially minimum" absorption amount of carbon dioxide per unit hour. The details will be mentioned later. Further, regarding the "lower limit amount of the device", the temperature of the carbon dioxide absorbent 16 may be set to be a temperature, in the above-described predetermined temperature range, which is close to the temperature at which the absorption amount of carbon dioxide becomes the maximum per unit hour. In this case, it is possible to decrease the temperature difference of the carbon dioxide absorbent 16 which is controlled depending on whether or not the carbon dioxide concentration is equal to or less than the set value, thereby exhibiting an effect of rapidly changing the absorption amount of carbon dioxide of the absorbent per unit hour.

In addition, the "lower limit amount of the device" may be the absorption amount of carbon dioxide of the carbon dioxide absorbent 16 per unit hour at a temperature (for example, room temperature) in a state where energy (for example, heat) is not applied to the carbon dioxide absorbent 16 by external means (for example, a heater). In this case, an economical effect in that power for cooling the carbon dioxide absorbent 16 is not necessary, and thus extra power is not consumed is obtained. Further, it is preferable that the "lower limit amount of the device" is the amount which is not adsorbed until the carbon dioxide concentration is further decreased under the condition that the value of the carbon dioxide concentration is greater than 0 and is close to the carbon dioxide concentration in a general atmosphere. When the lower limit amount of the device is set as described above, in a case where the carbon dioxide concentration is close to the carbon dioxide concentration in the general atmosphere, it is possible to substantially stop absorbing carbon dioxide, thereby exhibiting an effect in that the carbon dioxide concentration in the air is prevented from being decreased to adversely affect the human body.

In addition, the above-described set value maybe an upper limit value of the carbon dioxide concentration which is considered to be appropriate in the air of the inside of the space. Typically, the carbon dioxide concentration is appropriately 400 ppm in an outdoor atmosphere. However, for example, in a case where the ventilation of the space in which the ventilation can be controlled is limited, when living things such as human beings breathe, the carbon dioxide concentration in the air is increased. As described above, it has been known that when the carbon dioxide concentration in the air is greater than 1000 ppm, human beings easily feel sleepy, and the loss of concentration is caused. In addition, it has been known that when the carbon dioxide concentration in the air which is greater than 1000 ppm is further increased, significant damage is caused to health. As described above, the set value of the carbon dioxide concentration may be set to be 1000 ppm at which human beings easily feel sleepy, and the loss of concentration is caused. Note that, the set value may be a value which is set in advance at the time of shipping commodities, or a value which can be freely set-input and changed by a user of the carbon dioxide concentration control device 10. In this regard, it is likely that there are individual differences in sensitivity with respect to the carbon dioxide concentration. For example, in a case where a person who is sensitive to the increase in the carbon dioxide concentration uses the carbon dioxide concentration control device, it is desired that a low concentration can be set as the set value such that the set value is set to be 500 ppm.

The state control unit 152 changes the rate at which the carbon dioxide absorbent absorbs the carbon dioxide in the air (the absorption amount of carbon dioxide per unit hour) by controlling the temperature of the carbon dioxide absorbent 16. For example, the carbon dioxide absorbent 16 is provided with a heating unit (a heater) (not shown) for changing the temperature of the carbon dioxide absorbent 16 to a temperature in a range from room temperature to equal to or lower than 100° C., and the state control unit 152 controls the temperature of the carbon dioxide absorbent 16 by heating the carbon dioxide absorbent 16 with the heater. Note that, the state control unit 152 may be further provided with a cooling unit so as to cool the carbon dioxide absorbent 16.

Meanwhile, as an example of a method of controlling the temperature, heating by the heater, and controlling the temperature by a Peltier element. In a case where the heater and the Peltier element are applied to the state control unit 152, such temperature control means is relatively inexpensive, and a manufacturing cost of the carbon dioxide concentration control device 10 can be suppressed. In addition, a temperature sensor (not shown) for measuring the temperature of the carbon dioxide absorbent 16 may be provided in the vicinity of the carbon dioxide absorbent 16, or may be provided so as to be in contact with the carbon dioxide absorbent 16. The state control unit 152 and the temperature sensor are communicably connected to each other such that the state control unit 152 frequently obtains the temperature of the carbon dioxide absorbent 16 which is measured by the temperature sensor.

Further, as another example of the method of controlling the temperature, a method which is performed by providing a shutter, instead of the heater, which connects the carbon dioxide absorbent 16 to the compartment of the vehicle on a flow path such that a cross-sectional area of the flow path can be changed by opening and closing the shutter may be employed. Meanwhile, a configuration of using both of the shutter and the heater may be employed.

The carbon dioxide absorbent 16 is an absorbent in which the absorption amount of carbon dioxide (the absorbing rate of carbon dioxide) per unit hour is changed in accordance with the transition of the state of the carbon dioxide absorbent 16. The carbon dioxide absorbent 16 may be, for example, a filter having the lithium-based composite oxide installed therein, and when airflow passes through the filter, the carbon dioxide which is contained in the airflow is absorbed. The amount of the lithium-based composite oxide which is installed in the carbon dioxide absorbent 16 may be the amount which the carbon dioxide concentration in the compartment of the vehicle can be controlled for a predetermined time (for example, the time for a normal continuous operation), and the carbon dioxide concentration control device 10 can be attached and portable (portable type).

The second drive energy supply unit (the second power supply unit) 13 is provided with a connecting portion (a plug) which is connected to an external power supply source (a second power supply source) 100 such as household power, an AC power which is input via the plug, and an AC-DC converter for converting the AC power into a DC power corresponding to the regeneration control unit 14. Note that, the second drive energy supply unit 13 may supply the power which is suitable for the regeneration control unit 14 from a power source outside the vehicle, and examples thereof may include the connecting portion for connecting a charger for an electric car to the household fuel cell, and the AC-DC converter for converting the power which is suitable for the regeneration control unit 14. Further, the second drive energy supply unit 13 may be, for example, a current limiting unit which can be provided in the first drive energy supply unit 11. That is, the external power supply source 100 is merely an example of the power source for supplying the power to the carbon dioxide concentration control device 10 from the second drive energy supply unit 13.

The regeneration control unit 14 is provided with a heater for increasing the temperature of the carbon dioxide absorbent 16 up to a temperature at which the carbon dioxide can be discharged (for example, approximately 300° C. in a case of the lithium-based composite oxide). Note that, the regeneration control unit 14 is not limited to the aforementioned heater, and may include any one as long as the temperature of the carbon dioxide absorbent 16 can be increased up to a temperature at which the carbon dioxide can be discharged (for example, approximately 300° C.). For example, a configuration in which the state control unit 152 uses the heater and the Peltier element which are employed to control the temperature of the carbon dioxide absorbent 16 as the regeneration control unit 14 may be employed.

Note that, here, the carbon dioxide concentration control device 10 of the present invention is described as the carbon dioxide concentration control device 10 for a vehicle which is used in the compartment of the vehicle such as an automobile, but is not limited thereto. Since the first drive energy supply unit 11 can supply the power to the detecting unit 12 and the control unit 15 from a primary battery such as a dry cell or a secondary battery such as a lithium-ion battery, for example, even in an enclosed space in which the power source or the like is not provided, the carbon dioxide concentration control device 10 can appropriately control the carbon dioxide concentration in the aforementioned enclosed space. In addition, when the portable-type carbon dioxide concentration control device 10 is realized, the carbon dioxide concentration control device 10 can be provided in the enclosed space or can be attached from the enclosed space without significantly changing a configuration of a target enclosed space in which the carbon dioxide concentration is controlled. In addition, after absorbing the carbon dioxide in the air of the inside of the enclosed space, it is possible to discharge the carbon dioxide from the carbon dioxide absorbent 16 by moving the carbon dioxide concentration control device 10 to a place where the power can be supplied to the regeneration control unit 14 from the inside of the enclosed space via the second drive energy supply unit 13. Note that, the portable-type carbon dioxide concentration control device 10 will be described later.

(Installation Example of Carbon Dioxide Concentration Control Device 10)

Next, a case where the carbon dioxide concentration control device 10 is installed in the vicinity of a dash board in the compartment of the automobile will be described with reference to FIG. 2. FIG. 2 is a diagram illustrating an example of a case where the carbon dioxide concentration control device 10 is installed in a compartment of a vehicle.

As illustrated in FIG. 2, for example, it is possible to install the carbon dioxide concentration control device 10 in the vicinity of user's knees, who sits in the front passenger seat side. At this time, it is possible to supply the power to the carbon dioxide concentration control device 10 by inserting the cigar socket adaptor of the first drive energy supply unit 11 of the carbon dioxide concentration control device 10 into the cigar socket 3. Accordingly, it is possible to install the carbon dioxide concentration control device 10 in the vicinity of a driver's seat in which a steering wheel 2 is present. Note that, the first drive energy supply unit 11 may be, for example, a primary battery such as a dry cell or a secondary battery such as a lithium-ion battery, and thus a position in which the carbon dioxide concentration control device 10 is installed may be any position without limiting to the position of the cigar socket 3. In addition, in a case of the a bus which has a wide compartment, a plurality of the carbon dioxide concentration control devices 10 may be installed in one compartment.

As such, in the portable-type carbon dioxide concentration control device 10, there is no need to restructure the configuration of the vehicle, and it is possible to control the carbon dioxide concentration in the air to be an appropriate value for long periods of time. Further, the portable-type carbon dioxide concentration control device 10 does not become an obstacle even in a narrow space such as the compartment of the automobile, and thus the comfort in the compartment of the vehicle is not damaged.

(Portable-Type Carbon Dioxide Concentration Control Device 10)

Subsequently, the portable-type carbon dioxide concentration control device 10 will be described.

It is possible to realize the miniaturization of (portable-type) carbon dioxide concentration control device 10 by applying the lithium-based composite oxide having properties in which the absorption amount of carbon dioxide per unit area is large, and the absorption amount of carbon dioxide per unit hour is changed depending on the temperature as the carbon dioxide absorbent 16. With this, the carbon dioxide concentration control device can be easily applied to the enclosed spaced, and does not become an obstacle.

However, in order to realize the portable-type carbon dioxide concentration control device 10, the amount of the carbon dioxide absorbent 16 is controlled, and thus there is a problem in that the carbon dioxide to be absorbed is necessary to be regenerated on a regular basis.

For example, in a case where only a driver is present in the compartment of the automobile, the amount of the carbon dioxide absorbent 16 which is required to prevent the carbon dioxide concentration in the air of the inside of the closed compartment of the vehicle from being increased may be approximately 1.3 kg in a case where the lithium-based composite oxide is used as the carbon dioxide absorbent 16. However, if the carbon dioxide absorbent 16 cannot be regenerated (refreshed) by discharging the carbon dioxide absorbed by the carbon dioxide absorbent 16, it is not possible to control the carbon dioxide concentration in the compart of the vehicle to be an appropriate value for long periods of time. That is, if means for regenerating the carbon dioxide absorbent 16 is not provided, there is a problem in that even when the portable-type carbon dioxide concentration control device 10 can be realized, it cannot be used in the compartment of the vehicle for long periods of time. Further, in order to regenerate the carbon dioxide absorbent 16, it is necessary to perform a heating process on the carbon dioxide absorbent 16 at a temperature of equal to or higher than 300° C., and the power for the heating process is difficult to be obtained in the compartment of the vehicle.

In this regard, the carbon dioxide concentration control device 10 according to the present invention is provided with the detecting unit 12 that detects the carbon dioxide concentration contained in the air of the inside of the space, the control unit 15 that controls a carbon dioxide absorbing rate of the carbon dioxide absorbent 16, and the regeneration control unit 14 that regenerates the carbon dioxide absorbent 16 by discharging the carbon dioxide absorbed by the carbon dioxide absorbent 16 from the carbon dioxide absorbent 16, and the power for driving each of the detecting unit 12, the control unit 15, and the regeneration control unit 14 is supplied from at least two or more of the power supply source. For example, the power is supplied to the detecting unit 12 and the control unit 15 from the first drive energy supply unit 11, and is supplied to the regeneration control unit 14 from the second drive energy supply unit 13. That is, the carbon dioxide concentration control device 10 can receive the supply of the power from at least two or more of the power supply sources. With this, it is possible to easily regenerate the carbon dioxide absorbent 16 on a regular basis by moving the carbon dioxide concentration control device 10 from the compartment of the vehicle to a place (house or the like) where the power can be supplied to the regeneration control unit 14. Since it is easy to regenerate the carbon dioxide adsorbing agent 16 by bring the carbon dioxide concentration control device 10, which is brought into the compartment of the vehicle so as to cause the carbon dioxide adsorbing agent 16 to adsorb carbon dioxide, to the outside of the compartment of the vehicle, the carbon dioxide concentration control device 10 can be used for long periods of time.

(Carbon Dioxide Absorbent 16)

Figure 10:
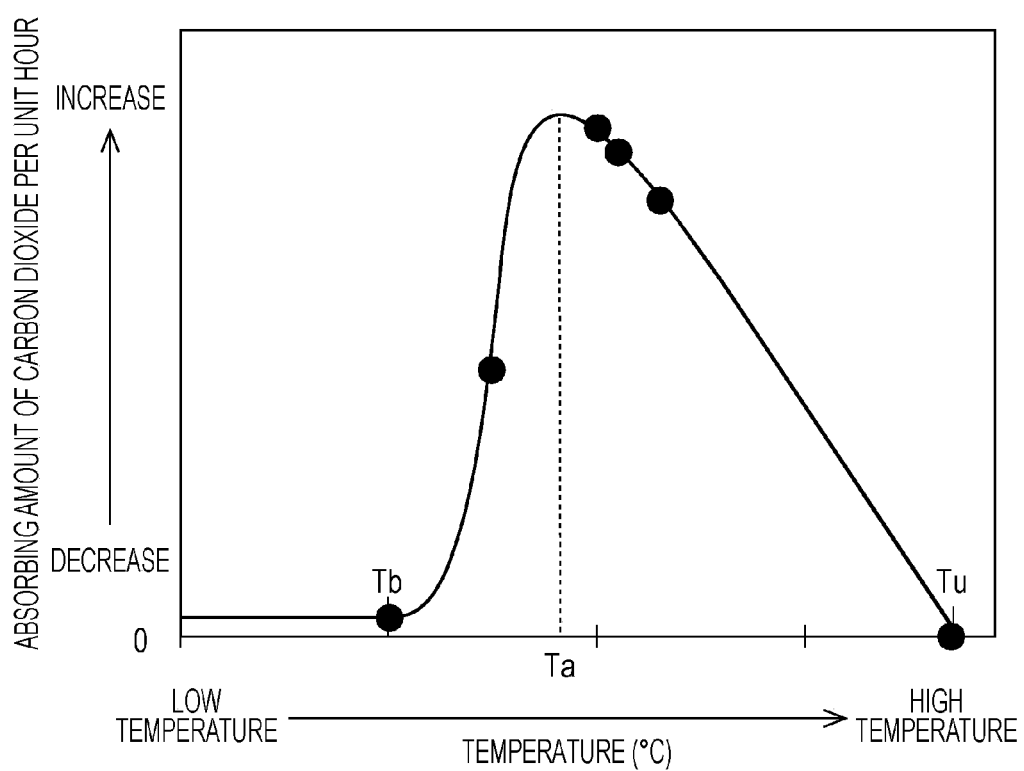
FIG. 10 is a graph illustrating an example of temperature dependence of the absorption amount of carbon dioxide per unit hour of a lithium-based composite oxide.
Figure 11:
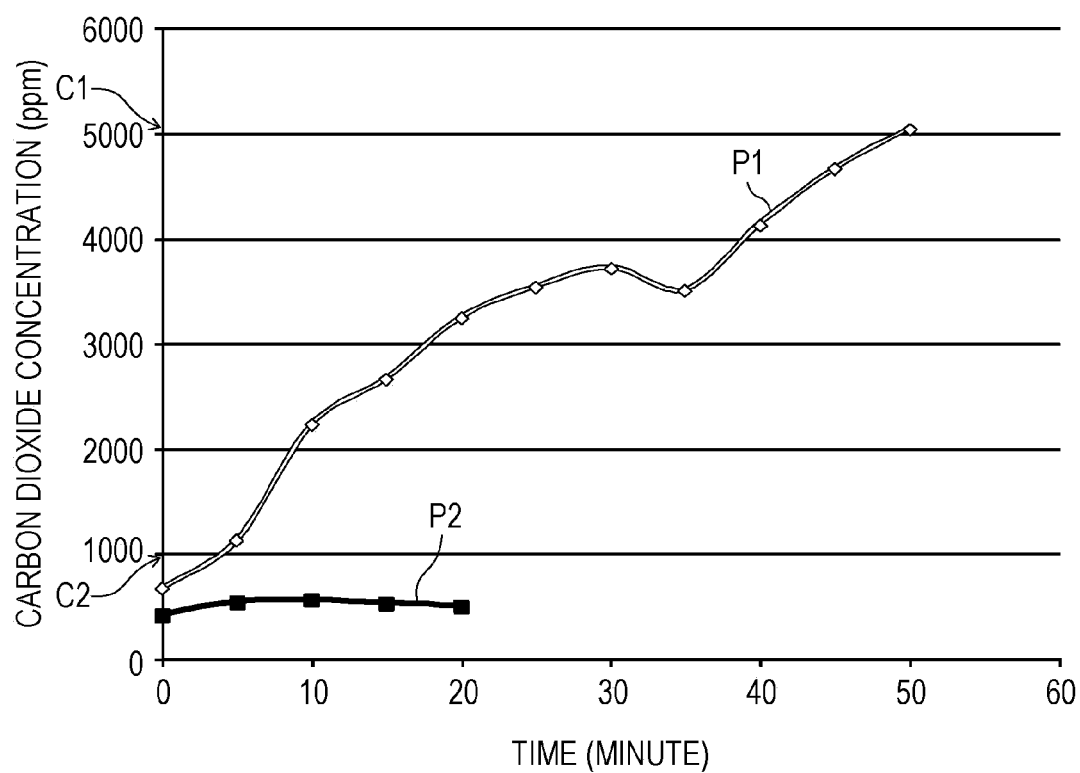
FIG. 11 is a graph illustrating an example of a result obtained by measuring a change of the carbon dioxide concentration in the compartment of the vehicle over time in a case where total three people of one adult and two children ride in the compartment of the closed vehicle.

Here, the temperature determination by the state determination unit 151 and the temperature control by the state control unit 152 will be described with reference to FIG. 10. First, a temperature feature in the properties of absorbing the carbon dioxide of the lithium-based composite oxide which is used as the carbon dioxide absorbent 16 will be described with reference to FIG. 10. FIG. 10 is a graph illustrating an example of temperature dependence of the absorption amount of carbon dioxide per unit hour of a lithium-based composite oxide. Note that, here, an example of a case where the absorbing rate of carbon dioxide is controlled by controlling the temperature of the carbon dioxide absorbent 16 with the lithium-based composite oxide as the carbon dioxide absorbent 16 is described; however, the present invention is not limited thereto. The carbon dioxide absorbent 16 may be an inorganic material such as activated carbon, zeolite, oxide silica sand (silicon), barium orthotitanate, and a porous cerium oxide, or may be an organic material such as an amine solution and polyamines. Here, it is preferable that the carbon dioxide absorbent 16 has a large amount of absorbable carbon dioxide per unit weight and the nature of discharging the absorbed carbon dioxide through a simple process.

The lithium-based composite oxide has a large absorption amount of carbon dioxide per unit weight which is maximum approximately 37 wt %, and the high absorbing rate of carbon dioxide at room temperature, and thus is suitable for the carbon dioxide absorbent 16 of the carbon dioxide concentration control device 10. In addition, the absorption of carbon dioxide by the lithium-based composite oxide is reversible, and thus the rate at which the lithium-based composite oxide absorbs carbon dioxide in the air (the absorption amount of carbon dioxide per unit hour) depends on the temperature. Here, the temperature of the lithium-based composite oxide when the absorption amount of carbon dioxide of the lithium-based composite oxide per unit hour becomes maximum is set as a temperature Ta. That is, the temperature Ta means a temperature (optimum temperature) at which the absorbing rate of carbon dioxide in the air by the carbon dioxide absorbent 16 is the maximum, and the temperature Ta is generally higher than room temperature.

As illustrated in FIG. 10, at a temperature which is lower than a temperature Tb, the absorption amount of carbon dioxide of the lithium-based composite oxide per unit hour is still substantially the minimum absorption amount of carbon dioxide per unit hour without being changed. When the temperature of the lithium-based composite oxide is increased up to the temperature Ta from the temperature Tb, the absorption amount of carbon dioxide of the lithium-based composite oxide per unit hour is increased in accordance with the increase in the temperature. When the temperature Ta is further increased up to higher temperature, the absorption amount of carbon dioxide per unit hour is decreased in accordance with the increase in the temperature, and the absorption amount of carbon dioxide per unit hour becomes substantially zero at a temperature Tu. As described above, the lithium-based composite oxide is the carbon dioxide absorbent 16 which can control the absorption amount of carbon dioxide per unit hour in accordance with the temperature thereof. Meanwhile, at a temperature which is higher than the temperature Tu, the absorption amount of carbon dioxide of the lithium-based composite oxide per unit hour becomes negative, that is, the lithium-based composite oxide does not absorb carbon dioxide, but discharges the absorbed carbon dioxide. The temperature Tu of a certain lithium-based composite oxide is, for example, 300° C.

Next, the temperature determination of the state determination unit 151 and the temperature control of the state control unit 152 will be described with reference to correlation between the above-described temperature of the lithium-based composite oxide and the absorption amount of carbon dioxide per unit hour.

In a case where the carbon dioxide concentration detected by the detecting unit 12 is greater than the set value, it can be said that the excessive amount of carbon dioxide (carbon dioxide at a level that is harmful to health) is contained in the air. In this case, the state determination unit 151 determines the temperature of the lithium-based composite oxide to be a temperature at which the absorption amount of carbon dioxide per unit hour becomes greater than the lower limit amount of device (for example, the temperature which is higher than the temperature Tb and is equal to or lower than the temperature Ta), and the state control unit 152 controls the temperature of the lithium-based composite oxide to be a temperature which is determined by the state determination unit 151. Through the aforementioned temperature control, the lithium-based composite oxide absorbs the amount of carbon dioxide which is larger than the minimum amount. Hereinafter, the sentence "the lithium-based composite oxide (carbon dioxide absorbent 16) absorbs the amount of carbon dioxide which is larger than lower limit amount of the device" is simply expressed by "the lithium-based composite oxide (carbon dioxide absorbent 16) absorbs carbon dioxide".

Here, in a case where the carbon dioxide concentration detected by the detecting unit 12 is greater than the set value, it is desired that the state determination unit 151 determines the temperature of the lithium-based composite oxide to be Ta. In this case, the absorption amount of carbon dioxide of the lithium-based composite oxide per unit hour is the maximum, and thus the carbon dioxide concentration control device 10 can absorb the most amount of carbon dioxide from the introduced air. Accordingly, the carbon dioxide concentration control device 10 has an advantage of more rapidly reducing the carbon dioxide concentration in the space.

In addition, in a case where the carbon dioxide concentration detected by the detecting unit 12 is greater than the set value, the state determination unit 151 may determine the temperature of the lithium-based composite oxide to be higher than Tb and less than Ta. In this case, it is possible to reduce the power for controlling (heating) the temperature of the lithium-based composite oxide in the state control unit 152. In other words, there is an advantage of the energy saving of the carbon dioxide concentration control device 10.

On the other hand, in a case where the carbon dioxide concentration detected by the detecting unit 12 is equal to or less than the set value, it can be said that the carbon dioxide concentration in the air is not at a level that is harmful to health. In this case, the state determination unit 151 determines the temperature of the lithium-based composite oxide to be a temperature (for example, a predetermined value which is equal to or less than Tb) at which the absorption amount of carbon dioxide per unit hour becomes the lower limit amount of the device, and the state control unit 152 controls the temperature of the lithium-based composite oxide to be the temperature determined in the state determination unit 151. Through the aforementioned temperature control, the lithium-based composite oxide does not absorb the carbon dioxide from the air as much as possible.

Here, in a case where the carbon dioxide concentration detected by the detecting unit 12 is equal to or less than the set value, the state determination unit 151 may determine the temperature of the lithium-based composite oxide to be room temperature. In this case, the state control unit 152 has an advantage of simply dissipating heat from the lithium-based composite oxide without using the power for the temperature control.

In addition, in a case where the carbon dioxide concentration detected by the detecting unit 12 is equal to or less than the set value, the state determination unit 151 may determine the temperature of the lithium-based composite oxide to be a temperature close to the temperature Ta, and determine the absorption amount of carbon dioxide to be the lower limit amount of the device per unit hour (for example, the temperature Tb). In this case, the lithium-based composite oxide is maintained to be at the temperature close to the temperature Ta even when carbon dioxide is not absorbed. For this reason, in a case where the carbon dioxide concentration in the air is changed, and thus the carbon dioxide is required to be absorbed, there is an advantage of more rapidly increasing the temperature of the lithium-based composite oxide so as to more rapidly absorb the carbon dioxide.

As described above, in accordance with the carbon dioxide concentration detected by the detecting unit 12, the state determination unit 151 compares the previously set carbon dioxide concentration with the carbon dioxide concentration detected by the detecting unit 12, and the lithium-based composite oxide and the state control unit 152 perform the temperature control of the lithium-based composite oxide. With this, the carbon dioxide concentration control device 10 can control the absorption amount of carbon dioxide of lithium-based composite oxide in accordance with the carbon dioxide concentration. For this reason, it is possible to cause the lithium-based composite oxide to absorb carbon dioxide at an appropriate rate in accordance with the carbon dioxide concentration in the air. Accordingly, the carbon dioxide concentration control device 10 can prevent carbon dioxide from being unnecessarily absorbed, and thus it is possible to control the carbon dioxide concentration in the air to be an appropriate value.

(Process of Controlling Carbon Dioxide Concentration in Air by Causing Carbon Dioxide Absorbent 16 to Absorb Carbon Dioxide)

Figure 3:
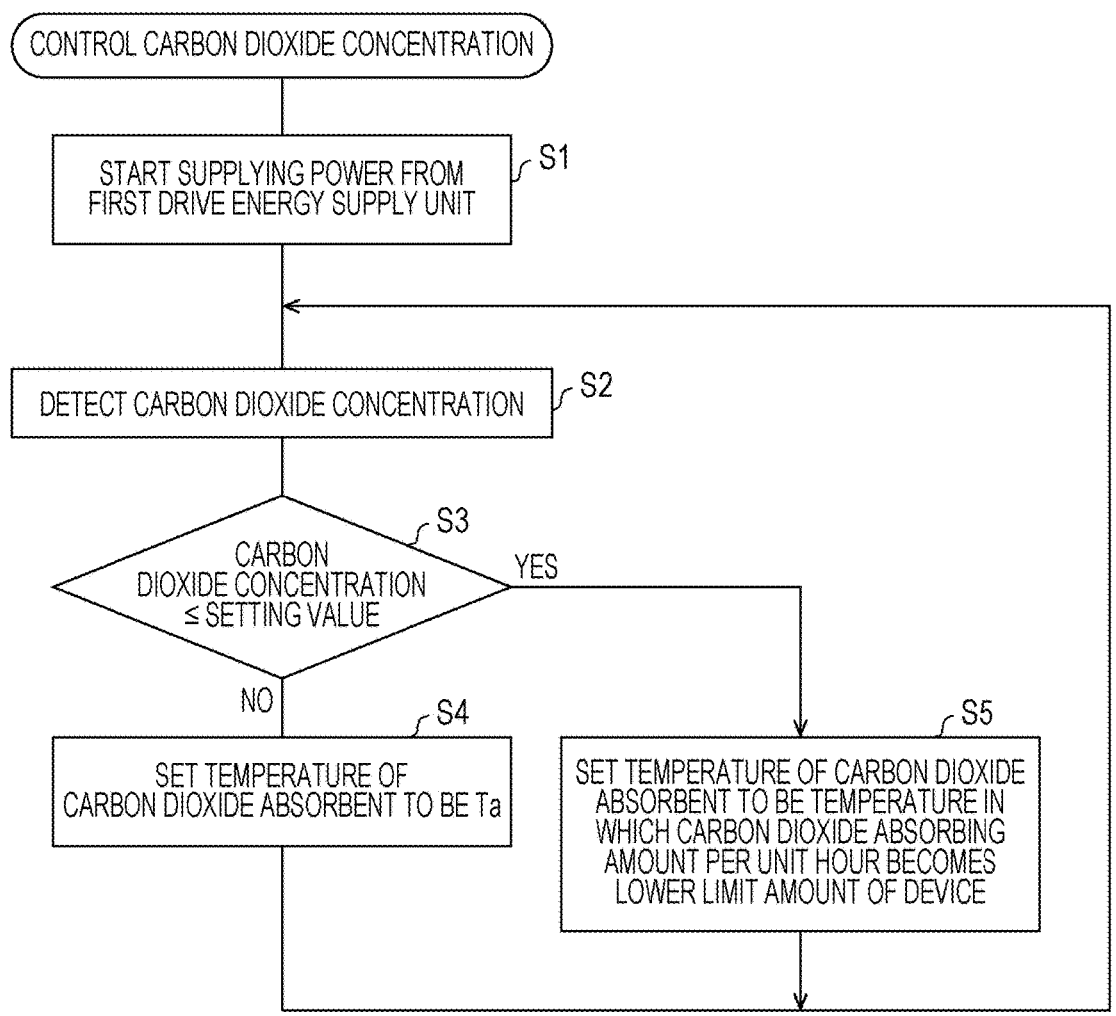
FIG. 3 is a flow chart illustrating an example of a processing flow for controlling a carbon dioxide concentration by the carbon dioxide concentration control device.

Next, an example of a process in which the carbon dioxide concentration control device 10 controls the carbon dioxide concentration in the space will be described. FIG. 3 is a flow chart illustrating an example of a processing flow for controlling a carbon dioxide concentration by the carbon dioxide concentration control device. Note that, here, the carbon dioxide concentration control device 10 is described with reference to an example of the case the carbon dioxide concentration control device is installed in the compartment of the automobile as illustrated in FIG. 2; however, the carbon dioxide concentration control device is not limited thereto.

When a plug of the first drive energy supply unit 11 is inserted into the cigar socket 3, and the power supply is started with respect to the detecting unit 12 and the control unit 15 (S1: a first power supply step), the carbon dioxide concentration control device 10 introduces the air into the detecting unit 12 and the carbon dioxide absorbent 16. In addition, the carbon dioxide concentration control device 10 transports some or whole introduced air to the detecting unit 12 and the carbon dioxide absorbent 16. The carbon dioxide absorbent 16 absorbs carbon dioxide in the air which passes through the carbon dioxide absorbent 16. The amount of carbon dioxide which is absorbed by the carbon dioxide absorbent 16 per unit hour can be increased or decreased by controlling the temperature of the carbon dioxide absorbent 16.

As described above, when the carbon dioxide concentration control device 10 is operated, the detecting unit 12 detects the carbon dioxide concentration in the air from some or whole introduced air at predetermined time intervals (S2: a detecting step). The detected value of the carbon dioxide concentration is transmitted to the state determination unit 151. The state determination unit 151 determines whether or not the carbon dioxide concentration detected by the detecting unit 12 is equal to or less than the set value (S3).

In a case where the carbon dioxide concentration detected by the detecting unit 12 is equal to or less than the set value (YES in S3), the state determination unit 151 determines the temperature of the carbon dioxide absorbent 16 to be a temperature (for example, room temperature) at which the absorption amount of carbon dioxide per unit hour becomes the lower limit amount of the device, and the state control unit 152 performs the temperature control such that the temperature of the carbon dioxide absorbent 16 is equal to the temperature determined by the state determination unit 151 (S5: a control step). With this, the absorption amount of carbon dioxide of the lithium complex oxide per unit hour becomes the lower limit amount of the device. In other words, the change of the carbon dioxide concentration in the air is suppressed to be the minimum.

On the other hand, in a case where the carbon dioxide concentration detected by the detecting unit 12 is greater than the set value (NO in S3), the state determination unit 151 determines the temperature of the carbon dioxide absorbent 16 to be the temperature Ta. In addition, the state control unit 152 controls the temperature of the carbon dioxide absorbent 16 to be increased so as to be set as the temperature Ta (S4: a control step). With this, the carbon dioxide absorbent 16 can absorb carbon dioxide by the amount depending on the temperature Ta.

The processes S3 to S5 are performed whenever the detecting unit 12 detects the carbon dioxide concentration, and are continuously performed until the plug of the first drive energy supply unit 11 is detached from the cigar socket 3, and the power supply to the detecting unit 12 and the control unit 15 is stopped. When the carbon dioxide concentration control device 10 introduces the air thereinto and discharges the air to the inside of the space while continuously performing the above control processes, the absorption amount of carbon dioxide of the carbon dioxide absorbent 16 per unit hour is controlled such that the carbon dioxide concentration in the space becomes a set value concentration.

According to the above-described processes, the carbon dioxide concentration control device 10 can control the absorption amount of carbon dioxide of the carbon dioxide absorbent 16 (lithium complex oxide) per unit hour in accordance with the carbon dioxide concentration in the air. For this reason, it is possible to cause the carbon dioxide absorbent 16 to absorb an appropriate amount of carbon dioxide in accordance with the carbon dioxide concentration in the air. Accordingly, the carbon dioxide concentration control device 10 can prevent carbon dioxide from being unnecessarily absorbed, and thus it is possible to maintain the carbon dioxide concentration in the air to be an appropriate value.

In addition, when the carbon dioxide concentration control device 10 controls the absorption amount of carbon dioxide of the absorbent per unit hour, the carbon dioxide concentration in the space can be controlled, and thus it is possible to simply control the absorption amount of carbon dioxide in the air without managing and controlling a complex parameter such as the amount of air introduced from the space, for example.

Note that, in the control processes, a time interval at which the detecting unit 12 detects the carbon dioxide concentration may be set in advance, or may be freely set by a user. There is an advantage in that as the time interval at which the detecting unit 12 performs detection is short, the adsorption amount of the carbon dioxide absorbent 16 can be controlled with high accuracy, and thus the carbon dioxide concentration in the space can be control with higher accuracy.

In the above description, the case where the absorption amount of carbon dioxide of the lithium complex oxide per unit hour is controlled depending on the temperature was described. However, the absorption amount of carbon dioxide of the carbon dioxide absorbent 16 per unit hour is not limited to the above-described case, and may be controlled by performing state control of other than the temperature. In this case, in a case where the carbon dioxide concentration detected by the detecting unit 12 is equal to or less than the set value (YES in S12), the state determination unit 151 may determine the state of the carbon dioxide absorbent 16 to a state (value) such that the absorption amount of carbon dioxide of the carbon dioxide absorbent 16 per unit hour becomes the lower limit amount of the device. In addition, in a case where the carbon dioxide concentration detected by the detecting unit 12 is greater than the set value (NO in S12), the state determination unit 151 may determine the state of the carbon dioxide absorbent 16 to be a state such that the absorption amount of carbon dioxide of the carbon dioxide absorbent 16 per unit hour is greater than the lower limit amount of the device.

(Process of Regenerating Carbon Dioxide Absorbent 16)

Figure 4:
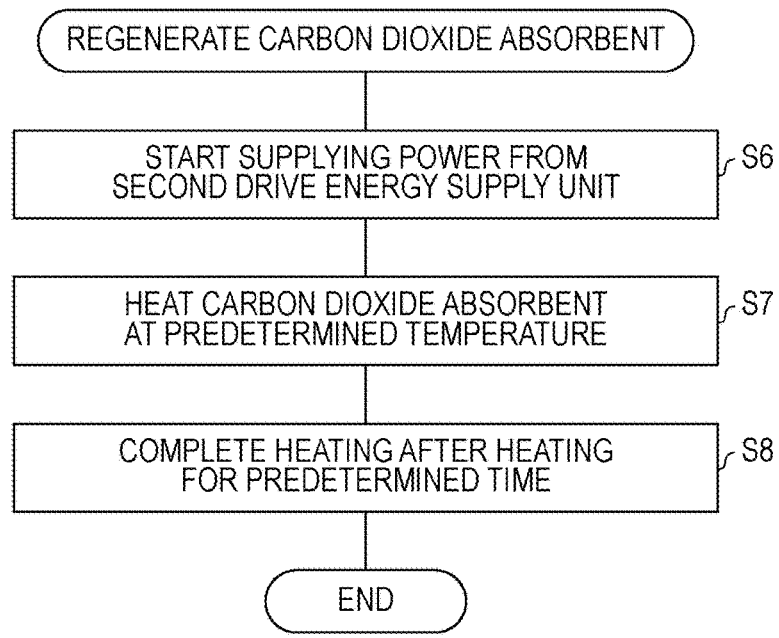
FIG. 4 is a flow chart illustrating an example of a processing flow for regenerating a carbon dioxide absorbent included in the carbon dioxide concentration control device.

Subsequently, a process of regenerating the carbon dioxide absorbent 16 by discharging carbon dioxide which is absorbed by the carbon dioxide absorbent 16 of the carbon dioxide concentration control device 10 will be described with reference to FIG. 4. FIG. 4 is a flow chart illustrating an example of a processing flow for regenerating the carbon dioxide absorbent 16 included in the carbon dioxide concentration control device. Note that, here, the carbon dioxide concentration control device 10 is brought to the outside of the vehicle (for example, a garage and the inside of the house) from the compartment of the vehicle in which the carbon dioxide concentration control device 10 is installed.

The power supply with respect to the regeneration control unit 14 is started by inserting the plug installed in the second drive energy supply unit 13 of the carbon dioxide concentration control device 10 into a household outlet (S6: a second power supply step), and the regeneration control unit 14 heats the carbon dioxide absorbent 16 up to a predetermined temperature (for example, approximately 300° C.) at which the carbon dioxide absorbent discharges carbon dioxide (S7: a regeneration step).

The carbon dioxide absorbent 16 which is heated and thus approaches a preferably temperature discharges the absorbed carbon dioxide. The regeneration control unit 14 finishes the heating after heating the carbon dioxide absorbent 16 for predetermined hours (S8). Note that, the heating of the carbon dioxide absorbent 16 at a predetermined temperature may be finished in a time (for example, one hour) which is set in advanced by, for example, a timer provided in the carbon dioxide concentration control device 10, and is defined in an instruction manual of the carbon dioxide concentration control device 10. Alternatively, the carbon dioxide concentration control device 10 is further provided with a state detection unit 21 (refer to FIG. 8 described below) that monitors the weight of the carbon dioxide absorbent 16, the state detection unit 21 can communicate with the regeneration control unit 14, and the regeneration control unit 14 may finish the heating the carbon dioxide absorbent 16 which is measured by the state detection unit when the weight thereof is decreased to the weight at a predetermined rate (for example, +5 wt %), which is heavier than the weight of the carbon dioxide absorbent 16 which does to absorb carbon dioxide. With this, the regeneration control unit 14 can appropriately control a heating time for regenerating the carbon dioxide absorbent 16. Accordingly, it is possible to prevent the carbon dioxide absorbent 16 from being unnecessarily heated for long time or being insufficiently regenerated at the time of regenerating the carbon dioxide absorbent 16. Note that, a configuration, in which both of the above-described timer and the state detection unit 21 are provided, and if criteria of any one of them are satisfied, the heating is finished, may be employed.

In addition, the second drive energy supply unit 13 is provided with a cable between an external power supply source such as an outlet and the connection portion, and at least a portion of the cable may be formed into a planar shape. The second drive energy supply unit 13 in which at least a portion of the cable is formed into the planar shape can be connected to the external power supply source at a position in which the connection is not easily performed via a cable of which a portion is not formed into the planar shape. For example, the cable of which at least a portion is formed into the planar shape can pass through a gap of width through which the cable of which a portion is not formed into the planar shape cannot pass.

In the process of regenerating the carbon dioxide absorbent 16, the carbon dioxide which is absorbed by the carbon dioxide absorbent 16 is discharged. For this reason, it is desired that the carbon dioxide absorbent 16 is generated in the outside of house (outdoor) without a risk of an increase in the carbon dioxide concentration. In a case where the carbon dioxide concentration control device 10 is installed outside of the house in a state where the connection portion of the cable is connected to the outlet in the house, the cable needs to pass through a window or a door, and thus the cable becomes an obstacle such that the window or the door cannot be completely closed. In this regard, a configuration, in which at least a portion of the cable is formed into the planar shape, and thus the cable can pass through a gap between the window and a window frame or a gap between the door and a door frame without being disconnected even when the window or the door of the house is closed, may be employed. The thickness of the planar-shaped portion of the cable is preferably equal to or less than 2 mm, is more preferably equal to or less than 1 mm, and is still more preferably equal to or less than 0.5 mm. On the other hand, the cable width of the planar shape may be optional, and may be is wider than the cable width of the portion which does not have the planar shape.

When the portion having the planar shape is interposed between the window and the window frame or between the door and the door frame, it is possible to shield the house by connecting the connection portion of the cable to the outlet in the house in a state where the carbon dioxide concentration control device 10 is placed outside of the house, and then closing the window and the door of the house. Accordingly, it is possible to perform the regeneration of the carbon dioxide absorbent 16 in a state where there is no risk of the increase in the carbon dioxide concentration in the house (indoor).

Modification Example of Controlling Carbon Dioxide Concentration by Using Process of Regenerating Carbon Dioxide Absorbent 16

Note that, the carbon dioxide concentration control device 10 can increase the carbon dioxide concentration in the air of the inside of an enclosed space by performing the regeneration of the carbon dioxide absorbent 16 in the enclosed space. Here, an example of controlling the carbon dioxide concentration by using the process of regenerating the carbon dioxide absorbent 16 will be briefly described below.

Typically, the carbon dioxide concentration is approximately 400 ppm in the atmosphere. In addition, as described above, the carbon dioxide concentration affects human body as being increased. On the other hand, it has been known that the carbon dioxide concentration affects human body even in a case where the carbon dioxide concentration is excessively low (for example, respiratory alkalosis).

In the carbon dioxide concentration control device 10, in a case where the carbon dioxide concentration detected by the detecting unit 12 is lower than a normal concentration in the air (for example, 200 ppm or the like), the state determination unit 151 determines a predetermined temperature of the carbon dioxide absorbent 16 to be a predetermined temperature (for example, equal to or higher than 300° C.) at which the carbon dioxide is discharged from the carbon dioxide absorbent 16. The information including the determined temperature is output to the state control unit 152. The state control unit 152 heats the carbon dioxide absorbent 16 by the heater so as to control the temperature of the carbon dioxide absorbent 16 to be the temperature determined by the state determination unit 151. Note that, when the detecting unit 12 detects that the carbon dioxide concentration to be detected is increased up to the normal carbon dioxide concentration (for example, 400 ppm), the state determination unit 151 may determine the temperature of the carbon dioxide absorbent 16 to be the temperature at which the absorption amount of carbon dioxide per unit hour becomes the lower limit amount of device.

As such, the carbon dioxide concentration control device 10 may be provided with means for discharging carbon dioxide form the carbon dioxide absorbent 16 in addition to means for controlling the absorption of carbon dioxide by the carbon dioxide absorbent 16. With this, it is possible to control the carbon dioxide concentration in the air of the inside of the enclosed spaced to be an appropriate concentration.

Application Example of Carbon Dioxide Concentration Control Device 10

FIG. 1 to FIG. 3 illustrate an example of the case where the carbon dioxide concentration control device 10 according to present invention is installed in the compartment of the automobile; however, the installment of the carbon dioxide concentration control device is not limited thereto.

For example, in a case where a user works or lives in a substantially enclosed space, it is possible to preferably use the carbon dioxide concentration control device by being installed in the enclosed space. Examples of the substantially enclosed space include the inside of a house including windows and doors are closed (including a bathroom), the inside of a compartment of an automobile (apparatus), the inside of an airplane cockpit such as cessna (apparatus), the inside of a compartment of a ship (apparatus), and the inside of a submarine (apparatus).

Further, according to the carbon dioxide concentration control device 10 of the present invention, examples of the space, in which the carbon dioxide concentration of the inside is controlled, include breeding equipment (apparatus), culture equipment (apparatus), and cultivation equipment (including cultivation facility of recombinant plants) (apparatus).

In addition, even in the inside of a thermostatic chamber such as a research facility (including a low-temperature chamber) (apparatus), the inside of a shelter (apparatus), and the inside of a basement (apparatus), the carbon dioxide concentration control device 10 can appropriately control the carbon dioxide concentration of the inside of the substantially enclosed space.

Embodiment 2

Figure 5:
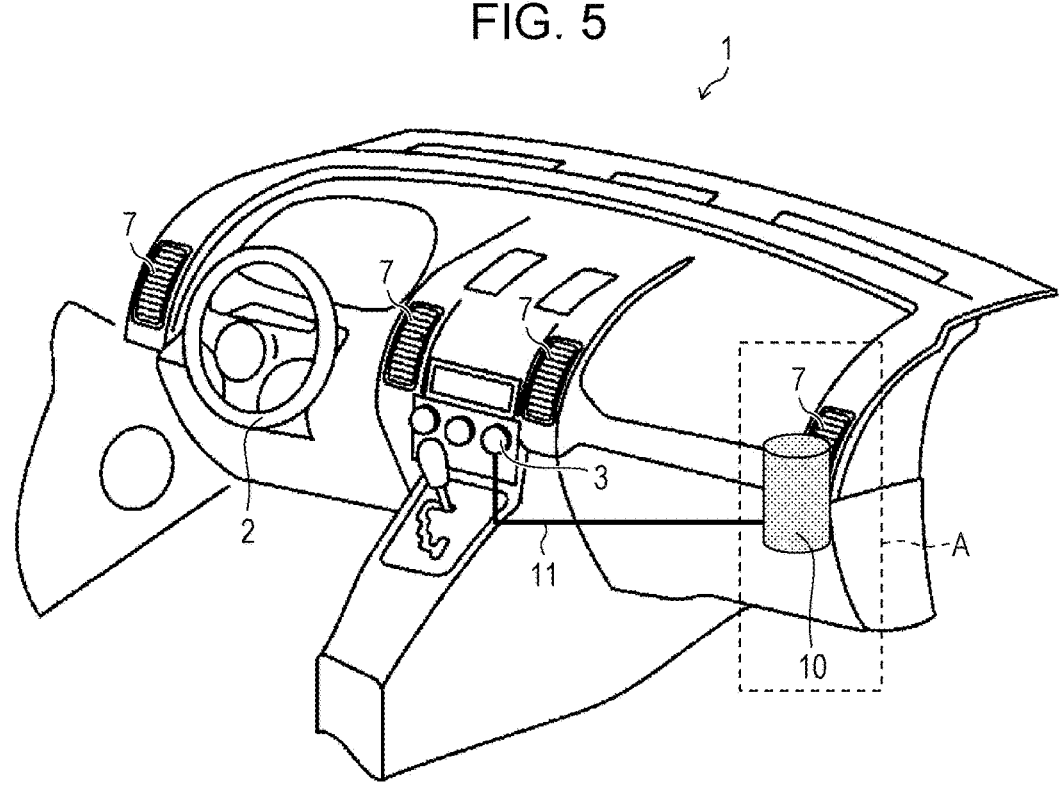
FIG. 5 is a diagram illustrating an example of a case where a carbon dioxide concentration control device according to Embodiment 2 of the present invention is installed in the compartment of the vehicle.

Another embodiment of the invention will be described with reference to FIG. 5 and FIG. 6 as described below. Note that, for the sake of convenience of explanation, components which have the same functions as those in the above-described embodiment are denoted by the same reference numerals and the detailed description thereof will be omitted. In the present embodiment, unlike the above-described embodiment, the carbon dioxide concentration control device 10 is provided in the vicinity of an air outlet (a blowout port) 7 of an air conditioning airflow from an air conditioner (air conditioning system) which is incorporated into a dashboard in the compartment of the vehicle. FIG. 5 is a diagram illustrating an example of a case where the carbon dioxide concentration control device 10 according to Embodiment 2 of the present invention is installed in the compartment of the vehicle. It is possible to efficiently control the carbon dioxide concentration in the compartment of the vehicle by introducing the air conditioning airflow of the air conditioner to the carbon dioxide absorbent 16 in the carbon dioxide concentration control device 10.

A method of installing the carbon dioxide concentration control device 10 by using the air conditioning airflow of the air conditioner will be described with reference to FIG. 6. FIG. 6 is a diagram schematically illustrating a method of installing the carbon dioxide concentration control device 10 in FIG. 5.

Figure 6:
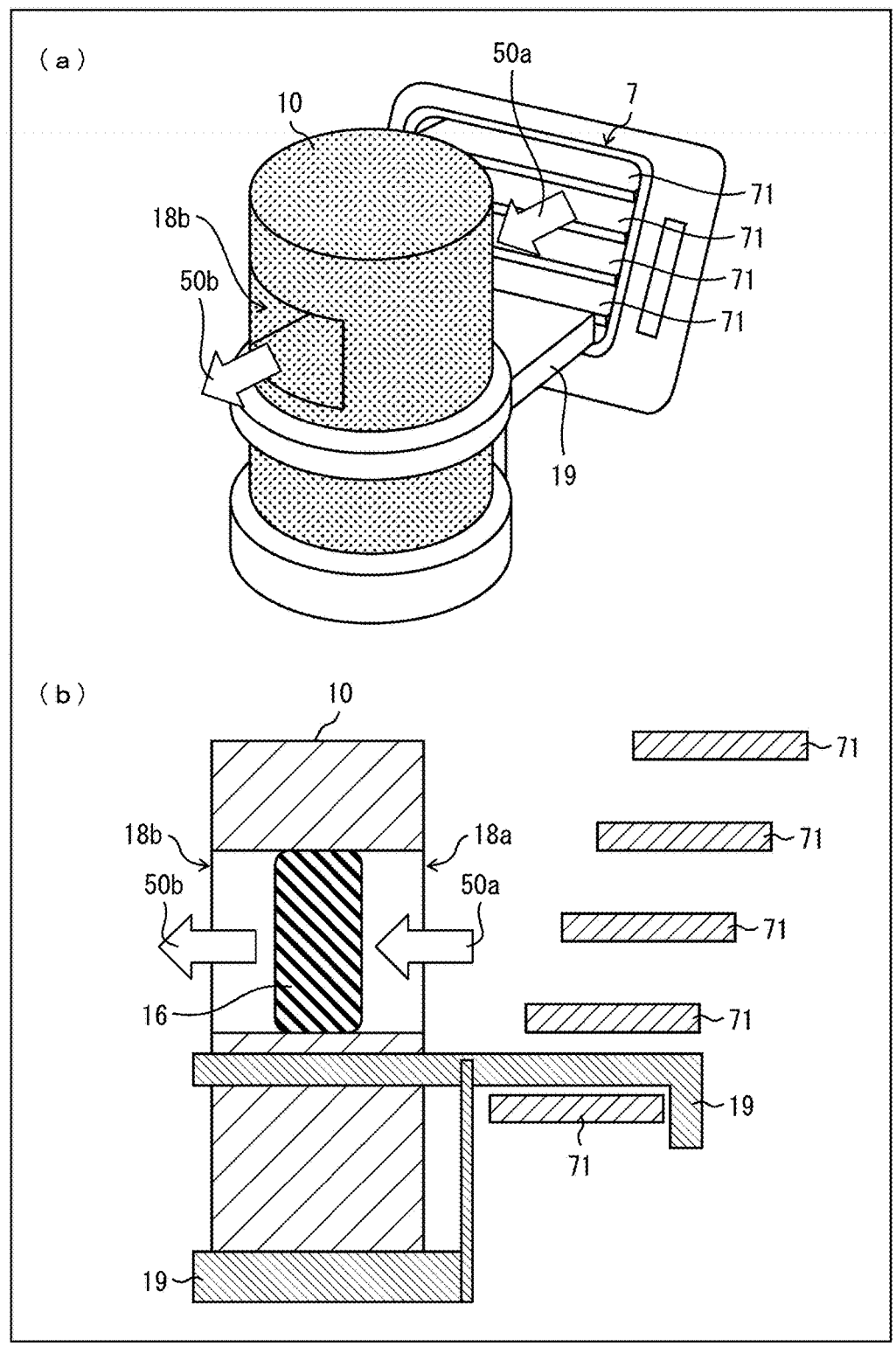
FIG. 6 is a diagram schematically illustrating a method of installing the carbon dioxide concentration control device in FIG. 5.

As illustrated in (a) of FIG. 6 and (b) of FIG. 6, a mounting hook 19 which fixes the carbon dioxide concentration control device 10 to the vicinity of the air outlet 7 of the air conditioning airflow is attached to a fan 71 provided in the air outlet 7 of the air conditioning airflow of the air conditioner. Further, an opening (an airflow intake portion) 18a is provided at a position in which an airflow 50a blown out from the air outlet 7 of the air conditioning airflow can be efficiently absorbed, and an opening (an airflow intake portion) 18b is provided in a blowing direction of the airflow. From the opening 18b, the airflow 50b which has passed through the carbon dioxide concentration control device 10 is blown out. With this, a flow path through which the airflow passes from the opening 18a to the opening 18b is secured and the carbon dioxide absorbent 16 (and the detecting unit 12) is disposed in the flow path. Note that, a mechanism of adjusting the heights of the opening 18a and the opening 18b of the carbon dioxide concentration control device 10 may be provided on a bottom surface or the like of the carbon dioxide concentration control device 10.

In the enclosed space such as the inside of the compartment of the automobile, the carbon dioxide may adversely affect a human body (for example, carbon dioxide of approximately 1000 ppm causes loss of concentration and inducement of sleepiness), and thus it is necessary to suppress carbon dioxide for long periods of time such that the carbon dioxide concentration is not increased. It is necessary to pay attention particularly in a case where the air conditioner using (circulation) the air in a room. The carbon dioxide concentration control device 10 according to the present embodiment can use the air conditioning airflow of the air conditioner without being provided with a fan for introducing the air to its own device, and thus it is possible to efficiently control the carbon dioxide concentration.

Note that, the carbon dioxide concentration control device 10 according to the present embodiment is applicable to the air outlet of the air conditioner which is provided in the target space, in which the carbon dioxide concentration is controlled, and the installment thereof is not limited to the inside of the compartment of the automobile.

Embodiment 3

Figure 7:
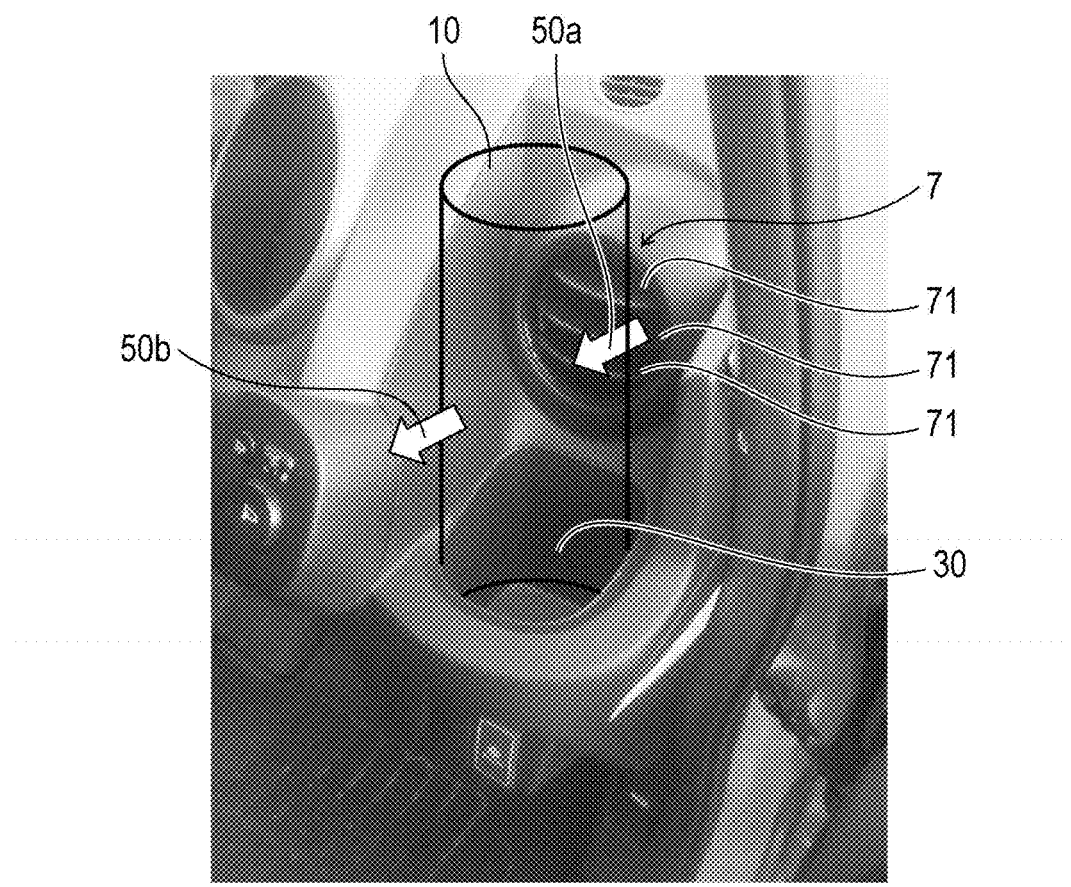
FIG. 7 is a diagram illustrating an example of a case where a carbon dioxide concentration control device according to Embodiment 3 of the present invention is installed in the compartment of the vehicle.

Subsequently, another method of fixing the carbon dioxide concentration control device 10 to the vicinity of the air conditioning airflow air outlet 7 will be described with reference to FIG. 7. Note that, for the sake of convenience of explanation, components which have the same functions as those in the above-described embodiment are denoted by the same reference numerals and the detailed description thereof will be omitted. FIG. 7 is a diagram illustrating an example of case where the carbon dioxide concentration control device 10 according to Embodiment 3 of the present invention is installed in the compartment of the vehicle.

As illustrated in FIG. 7, a concave portion 30 such as a cup holder which is provided in a dashboard of the automobile may be provided on the vehicle side from the air outlet 7 from which the airflow 50a of the air conditioner is blown out. The carbon dioxide concentration control device 10 may be fixed to the vicinity of the air outlet 7 of the air conditioning airflow by inserting the carbon dioxide concentration control device 10 into the concave portion 30 such as a cup holder which is provided in the dashboard. Note that, the mechanism of adjusting the height of the opening (airflow intake portion) 18a (refer to FIG. 6) of the carbon dioxide concentration control device 10 may be provided on the bottom surface of the carbon dioxide concentration control device 10. That is, means for efficiently introducing wind blown out from the air-blowout port of the existing air conditioner into the carbon dioxide concentration control device 10 may be provided.

Embodiment 4

Figure 8:
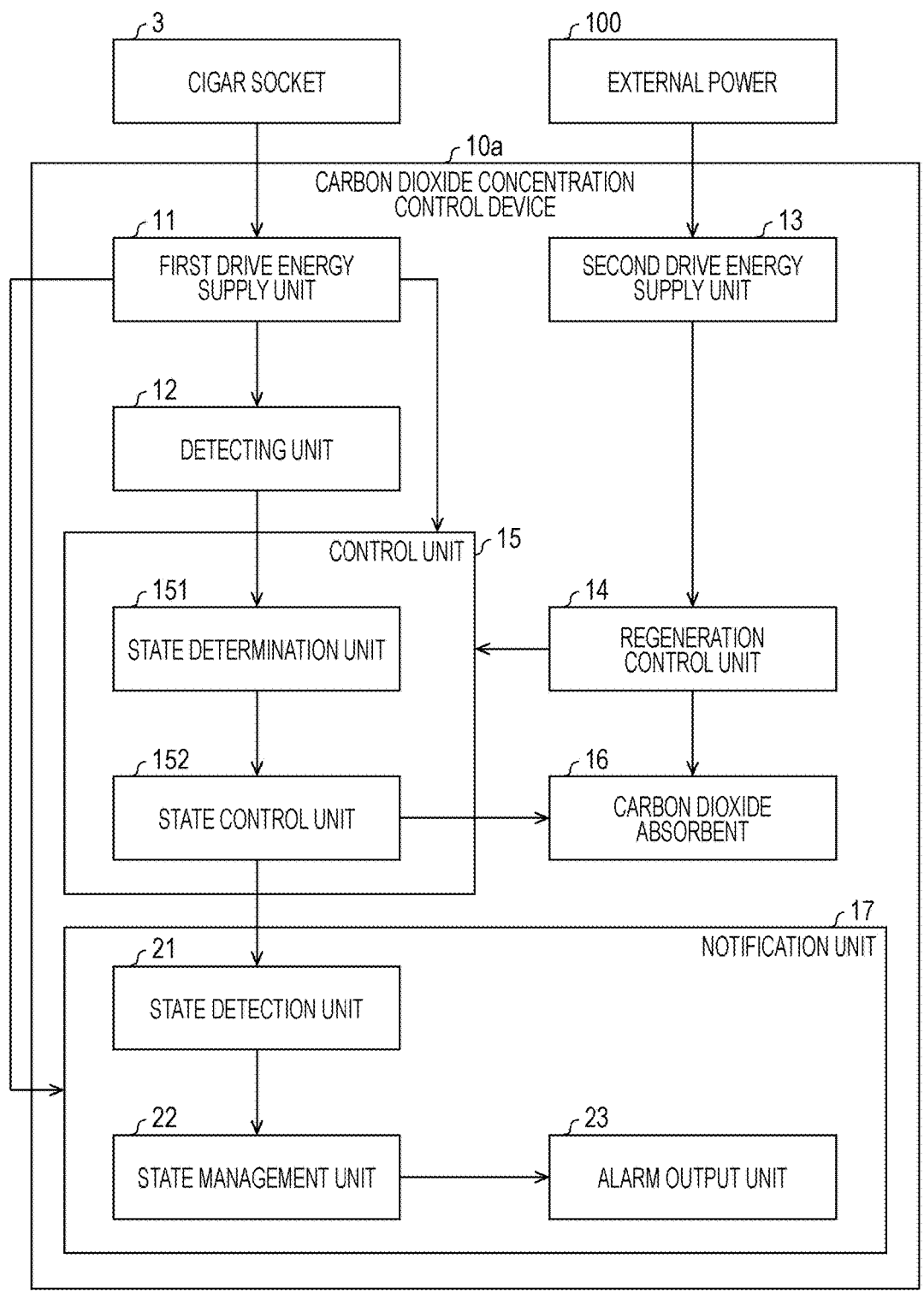
FIG. 8 is a diagram schematically illustrating a configuration example of a carbon dioxide concentration control device according to Embodiment 4 of the present invention.
Figure 9:
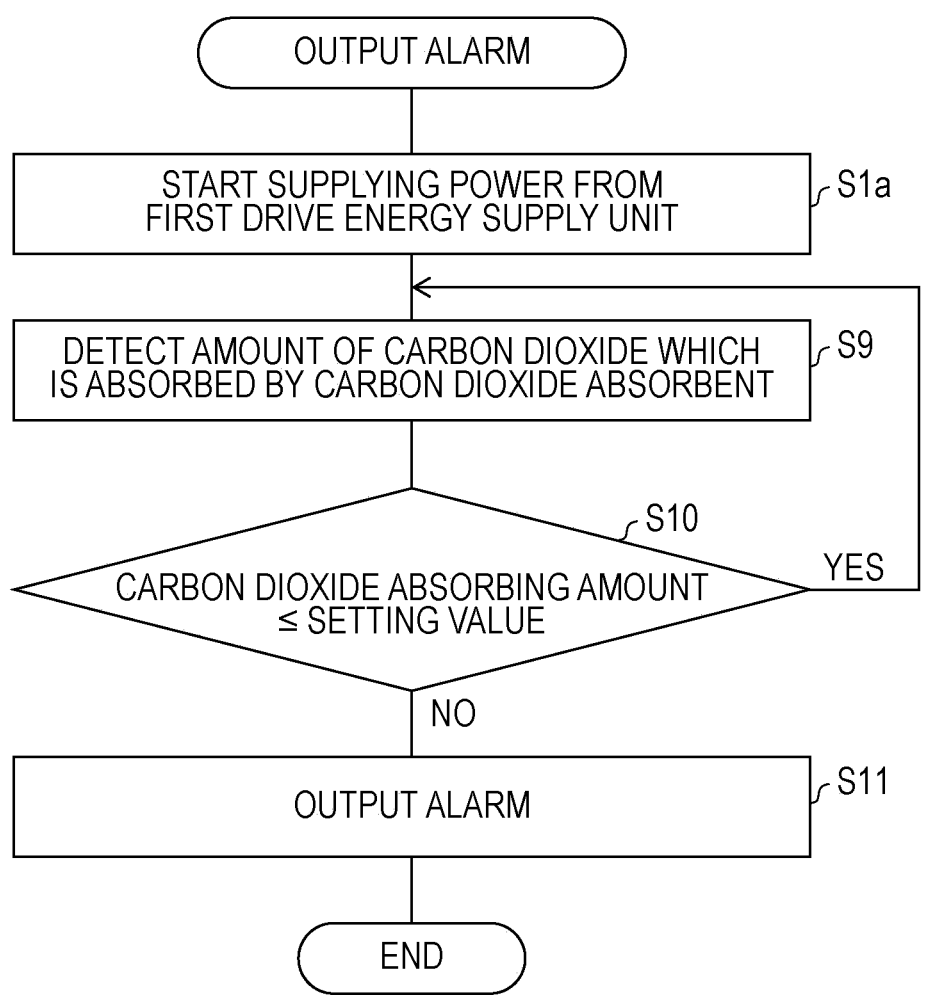
FIG. 9 is a flow chart illustrating an example of a processing flow in which the carbon dioxide concentration control device illustrated in FIG. 8 outputs an alarm in accordance with an amount of the carbon dioxide which is absorbed by a carbon dioxide absorbent.

Another embodiment of the invention will be described with reference to FIG. 8 and FIG. 9 as described below. Note that, for the sake of convenience of explanation, components which have the same functions as those in the above-described embodiment are denoted by the same reference numerals and the detailed description thereof will be omitted. FIG. 8 is a diagram schematically illustrating a configuration example of a carbon dioxide concentration control device 10a according to Embodiment 4 of the present invention. FIG. 9 is a flow chart illustrating an example of a processing flow in which the carbon dioxide concentration control device 10a illustrated in FIG. 8 outputs (notifies) an alarm in accordance with the amount of the carbon dioxide which is absorbed by the carbon dioxide absorbent 16.

The carbon dioxide concentration control device 10a according to the present embodiment is further provided with an informing unit (a notification unit) 17. The informing unit 17 is provided with a state detection unit 21 that detects the amount of carbon dioxide which is absorbed by the carbon dioxide absorbent 16, a state management unit 22 that manages the state of the carbon dioxide absorbent 16, and an alarm output unit 23 that warns a user about that the amount of carbon dioxide absorbed by the carbon dioxide absorbent 16 reaches a predetermined amount, and thus the carbon dioxide absorbent is to be regenerated.

The state detection unit 21 is a sensor for monitoring a change of weight of the carbon dioxide absorbent 16, or may be, for example, a pressure sensor for measuring a load generated at the time of supporting a main body by using the mounting hook 19 in a case where the carbon dioxide concentration control device 10a is supported by the mounting hook 19. In a case where a lithium-based oxide is used as the carbon dioxide absorbent 16, the amount of carbon dioxide which can be absorbed reaches 37% of the weight of the carbon dioxide absorbent 16, and thus the absorption amount of carbon dioxide can be detected by monitoring the change of the weight of the carbon dioxide absorbent 16. Note that, the state detection unit 21 is not limited to the example described above, and may be a mechanism that can detect the amount of the carbon dioxide absorbed by the carbon dioxide absorbent 16. For example, examples thereof may include a mechanism of detecting the amount of carbon dioxide absorbed by measuring electrical resistance of the carbon dioxide absorbent 16. In this regard, in order to suppress an increase in the cost at the time of manufacturing the carbon dioxide concentration control device 10a, it is desired to apply a pressure sensor capable of detecting the increase in weight of the main body with a simple mechanism. Note that, in addition to the pressure sensor, the carbon dioxide concentration control device 10a may be provided with an acceleration sensor. It is possible to decrease difference which can be included in the detection result by detecting the vibration of the vehicle using the acceleration sensor.

Further, the state detection unit 21 integrates an operation time of the carbon dioxide concentration control device 10a, that is, an operation time of the control unit 15 is integrated, and the state detection unit 21 may be provided with an estimating mechanism that estimates the amount of carbon dioxide absorbed by the carbon dioxide absorbent 16 based on the operation time of the control unit 15. Here, "integrated operating time" means a total time in which the carbon dioxide is continuously or intermittently absorbed by the carbon dioxide adsorbing agent 16 in a certain case; in other words, a total operation time of the control unit 15 from the time for generating the carbon dioxide adsorbing agent 16 to the time for generating the next carbon dioxide adsorbing agent. It cannot be said that when the amount of the carbon dioxide absorbed by the carbon dioxide absorbent 16 is measured by using the pressure sensor in which the difference is likely to occur due to the vibration of the vehicle, or the electrical resistance in which a measurement error is likely to occur, it is possible to accurately measure the amount of the carbon dioxide. In this regard, the amount of carbon dioxide absorbed by the carbon dioxide absorbent 16 may be steadily estimated by configuring the carbon dioxide concentration control device 10a as described above. In addition, with such a configuration, it is possible to reduce the cost for estimating the amount of carbon dioxide absorbed by the carbon dioxide absorbent 16 by the state detection unit 21.

In a case where the previously set value and the value detected by the state detection unit 21 are compared with each other, and the value detected by the state detection unit 21 is greater than the set value, the state management unit 22 controls the alarm output unit 23 to output an alarm.

The alarm output unit 23 issues a warning to the user in accordance with the control by the state management unit 22. As a warning method, any method may be employed as long as to arouse the attention of the user, for example, a sound (warning sound) may be issued and light (warning light) may be turned on.

As such, the carbon dioxide concentration control device 10a according to Embodiment 4 determines whether or not the state management unit 22 issues the alarm based on the amount of carbon dioxide absorbed by the carbon dioxide absorbent 16, which is detected by the state detection unit 21, and then controls the alarm output unit. With this, the carbon dioxide concentration control device 10a can inform the user whether or not the carbon dioxide concentration can be controlled. Accordingly, it is possible to appropriately regenerate the carbon dioxide adsorbing agent 16, and appropriately control the carbon dioxide concentration in the space of the compartment of the vehicle.

Subsequently, a processing flow in which the carbon dioxide concentration control device 10a according to the present embodiment outputs the alarm in accordance with the amount of carbon dioxide absorbed by the carbon dioxide absorbent 16 will be described with reference to FIG. 9. FIG. 9 is a flow chart illustrating an example of a processing flow in which the carbon dioxide concentration control device 10a illustrated in FIG. 8 outputs an alarm in accordance with the amount of the carbon dioxide which is absorbed by the carbon dioxide absorbent 16. Note that, here, an example of the case where the carbon dioxide concentration control device 10a in the compartment of the automobile is used is used; however, the present embodiment is not limited thereto.

When a plug of the first drive energy supply unit 11 is inserted into the cigar socket 3, and the power supply is started with respect to the detecting unit 12, the control unit 15, and the informing unit 17 (S1a: a first power supply step), the carbon dioxide concentration control device 10a introduces the air into the detecting unit 12 and the carbon dioxide absorbent 16. In addition, the carbon dioxide concentration control device 10a may introduce some of the air conditioning airflow of the air conditioner, and transports some or whole introduced air to the detecting unit 12 and the carbon dioxide absorbent 16. The carbon dioxide absorbent 16 absorbs carbon dioxide in the air which passes through the carbon dioxide absorbent 16.

The state detection unit 21 detects the amount of the carbon dioxide which is absorbed by the carbon dioxide absorbent 16 (S9). In a case where the previously set value and the value (such as weight of the carbon dioxide absorbent 16) detected by the state detection unit 21 are compared with each other, and the value detected by the state detection unit 21 is greater than the set value (NO in S10), the state management unit 22 controls the alarm output unit 23 to output an alarm.

The alarm output unit 23 issues a warning in accordance with the control by the state management unit 22 (S11).

Embodiment 5

The carbon dioxide concentration control device 10a may determine whether or not the state management unit 22 issues the alarm based on the change rate of the amount of carbon dioxide absorbed by the carbon dioxide absorbent 16, which is detected by the state detection unit 21, and then controls the alarm output unit 23.

In a case where dry ice is used in the substantially enclosed space such as a low-temperature chamber or a laboratory, it is necessary to pay attention to the rapid increase in the carbon dioxide concentration. In the carbon dioxide concentration control device 10a according to the present embodiment, when the fact that the carbon dioxide concentration is increased up to equal to or greater than a predetermined rate for a predetermined periods of time is detected by the state detection unit 21, the state management unit 22 controls the alarm output unit 23 to output the alarm to the user. With this, it is possible to encourage the user to rapidly exit from the space or to start ventilate the air of the inside of the space by using the outside air.

Note that, the rapid increase in the carbon dioxide concentration is also detected by the detecting unit 12. In a case where the detecting unit 12 detects high concentration of carbon dioxide, the state management unit 22 obtains the detection result and then the alarm output unit 23 may be controlled to output the alarm to the user.

CONCLUSION

According to Aspect 1 of the present invention, a carbon dioxide concentration control device (10) is a portable-type carbon dioxide concentration control device, which controls a carbon dioxide concentration contained in air in a target space, in which the carbon dioxide concentration is controlled, by using an absorbent (carbon dioxide absorbent 16) which is capable of controlling an absorbing rate of carbon dioxide. The portable-type carbon dioxide concentration control device includes a detecting unit 12 that detects the carbon dioxide concentration; a control unit 15 that controls absorbing rate of the absorbent; a regeneration unit (regeneration control unit 14) that regenerates the absorbent by discharging the carbon dioxide absorbed by the absorbent from the absorbent; a first power supply unit (a first drive energy supply unit 11) that supplies power for driving the detecting unit and the control unit from a first power supply source; and a second power supply unit (a second drive energy supply unit 13) that supplies power for driving the regeneration unit from a second power supply source which is different from the first power supply source.

According to the above-described configuration, the carbon dioxide concentration control device discharges the carbon dioxide absorbed by the absorbent, and supplies power for driving the regeneration unit that generates the absorbent from the second power supply source which is different from the first power supply source. With this, the power for driving the regeneration unit is supplied from the second power supply source which is different from the first power supply source. With this, it is possible to sufficiently secure the power for generating the absorbent. Accordingly, it is possible to control the carbon dioxide concentration in the air of the inside of a target space, in which the carbon dioxide concentration is controlled, to be an appropriate value for long periods of time. In addition, since the carbon dioxide concentration control device is a portable-type, it is possible to apply the carbon dioxide concentration control device to the target space without significantly changing a configuration of the target space in which the carbon dioxide concentration is controlled.

According to Aspect 2 of the present invention, in the carbon dioxide concentration control device according to the above Aspect 1, the first power supply unit may supply the power for driving the detecting unit and the control unit from a first power supply source which is present in the space, and the second power supply unit may supply the power for driving the regeneration unit from a second power supply source which is present outside of the space.

With such a configuration, the power for driving the regeneration unit is supplied from the second power supply source which is present outside of the target space in which the carbon dioxide concentration is controlled by the carbon dioxide concentration control device. With this, it is possible to supply the power for generating the absorbent in the outside of the target space in which the carbon dioxide concentration is controlled. Accordingly, it is possible to stably secure the power for generating the absorbent.

According to Aspect 3 of the present invention, in the carbon dioxide concentration control device according to the above-described Aspect 2, the second power supply unit may be provided with a cable for obtaining power from the second power supply source which is present outside of the space, and at least a portion of the cable may be formed into a planar shape.

When at least a portion of the cable is formed into the planar shape, it is possible to obtain the power also from the second power supply source in which the power is not easily obtained though the cable of which a portion is not formed into the planar shape. For example, the cable of which at least a portion is formed into the planar shape can pass through a gap of width through which the cable of which a portion is not formed into the planar shape cannot pass.

According to Aspect 4 of the present invention, the carbon dioxide concentration control device according to any one of the above-described Aspects 1 to 3, in the space, an air conditioning system (air conditioner 7) with a blowout port for blowing out air to the inside of the space may be provided, and an airflow introduction portion (opening 18a) for introducing some of the air blown out from the blowout port to the absorbent may be further provided.

With such a configuration, some of the air blown out from the blowout port of the air conditioning system are introduced to the carbon dioxide concentration control device. With this, it is possible to efficiently control the carbon dioxide concentration in the compartment of the vehicle by introducing the airflow of the air conditioning system to the absorbent of the carbon dioxide concentration control device.

According to Aspect 5 of the present invention, the carbon dioxide concentration control device according to any one of the above-described Aspects 1 to 4 may further include a notification unit (an informing unit 17) that notifies a user that an amount of carbon dioxide absorbed by the absorbent reaches a predetermined amount.

With such a configuration, based on the amount of carbon dioxide absorbed by the absorbent, the user is notified that the amount of carbon dioxide absorbed by the absorbent reaches the predetermined amount. With this, the carbon dioxide concentration control device can inform the user whether or not the carbon dioxide concentration can be controlled. Accordingly, it is possible to appropriately regenerate carbon dioxide, and appropriately control the carbon dioxide concentration in the space of the compartment of the vehicle.

According to Aspect 6 of the present invention, in the carbon dioxide concentration control device according to the above-described Aspect 5, the notification unit may be provided with an estimating mechanism that estimates the amount of carbon dioxide absorbed by the carbon dioxide absorbent based on an integrated operation time obtained by integrating the operation times of the control unit, and may notify the user that the amount of carbon dioxide absorbed by the absorbent reaches a predetermined amount in a case where the estimating mechanism estimates that the amount of carbon dioxide absorbed by the absorbent reaches a predetermined amount.

For example, in a case where the amount of carbon dioxide absorbed by the absorbent in the compartment of the vehicle is measured by using a pressure sensor or electrical resistance, there is a concern in that a measurement error occurs due to the vibration of the vehicle or the like, and thereby the measurement cannot be correctly performed. With such a configuration, in a case where the fact that the amount of carbon dioxide absorbed by the absorbent reaches a predetermined amount is estimated based on the integrated operating time of the control unit, the user is notified that the amount of carbon dioxide absorbed by the absorbent reaches a predetermined amount. With this, the amount of carbon dioxide absorbed by the absorbent is not measured by using the pressure sensor or the electrical resistance, but is estimated based on the integrated operating time of the control unit, thereby notifying the user of the amount of carbon dioxide absorbed by the absorbent based on the estimation result. Accordingly, it is possible to avoid erroneous notification due to the occurrence of measurement error.

Further, according to Aspect 7 of the present invention, the carbon dioxide concentration control device according to any one of the above-described Aspects 1 to 4 may further include a notification unit (an informing unit 17) that notifies a user that an absorbing rate of carbon dioxide absorbed by the absorbent is equal to or greater than a predetermined rate.

With such a configuration, the user is notified that the absorption rate of carbon dioxide absorbed by the absorbent is equal to or greater than the predetermined rate. With this, the carbon dioxide concentration control device can rapidly and appropriately notify the user whether or not the current carbon dioxide concentration is high.

According to Aspect 8 of the present invention, in the carbon dioxide concentration control device according to any one of the above-described Aspects 1 to 7, the space may be the inside of a compartment of an automobile.

According to Aspect 9 of the present invention, an apparatus includes the carbon dioxide concentration control device according to any one of the above-described Aspects 1 to 8.

The present invention is not limited to the above-described embodiments, and for example, various modifications can be performed within the scope of the claims, and an embodiment obtained by combining technical means disclosed in different embodiments is also included in the technical scope of the present invention. Further, it is possible to form a new technical feature by combining technical means disclosed in the respective embodiments.

INDUSTRIAL APPLICABILITY

The present invention can be used for a carbon dioxide concentration control device that controls a carbon dioxide concentration in air, and an apparatus to which the carbon dioxide concentration control device is mounted.

REFERENCE SIGNS LIST

3 CIGAR SOCKET (THE FIRST POWER SUPPLY SOURCE)
10 CARBON DIOXIDE CONCENTRATION CONTROL DEVICE
11 FIRST DRIVE ENERGY SUPPLY UNIT (FIRST POWER SUPPLY UNIT)
12 DETECTING UNIT
13 SECOND DRIVE ENERGY SUPPLY UNIT (SECOND POWER SUPPLY UNIT)
14 REGENERATION CONTROL UNIT (REGENERATION UNIT)
15 CONTROL UNIT
16 CARBON DIOXIDE ABSORBENT (ABSORBENT)
17 INFORMING UNIT (NOTIFICATION UNIT)
18a OPENING (AIRFLOW INTAKE PORTION)
23 ALARM OUTPUT UNIT
100 EXTERNAL POWER SUPPLY SOURCE (SECOND POWER SUPPLY SOURCE)

The invention claimed is:

1. A carbon dioxide concentration control device which is a portable-type carbon dioxide concentration control device for controlling a carbon dioxide concentration contained in air in a target space in which the carbon dioxide concentration is controlled, by using an absorbent which is capable of controlling an absorbing rate of carbon dioxide, the device comprising:
    a detecting unit that detects the carbon dioxide concentration;
    a control unit that controls absorbing rate of the absorbent;
    a regeneration unit that regenerates the absorbent by discharging the carbon dioxide absorbed by the absorbent from the absorbent;
    a first power supply unit that supplies power for driving the detecting unit and the control unit from a first power supply source; and
    a second power supply unit that supplies power for driving the regeneration unit from a second power supply source which is different from the first power supply source,
    wherein the first power supply unit supplies the power for driving the detecting unit and the control unit from a first power supply source which is present in the space, and
    wherein the second power supply unit supplies the power for driving the regeneration unit from a second power supply source which is present outside of the space,
    wherein the second power supply unit is provided with a cable for obtaining power from the second power supply source which is present outside of the space, and
    wherein a portion of the cable interposed between a window and a window frame or between a door and a door frame is formed into a planar shape and a thickness of the portion of the cable is equal to or less than 2 mm, the window and the window frame or the door and the door frame being present between inside and outside of the space.

2. The carbon dioxide concentration control device according to claim 1,
    wherein in the space, an air conditioning system with a blowout port for blowing out air to the inside of the space is provided, and an airflow introduction portion for introducing some of the air blown out from the blowout port to the absorbent is further provided.

3. The carbon dioxide concentration control device according to claim 1, further comprising:
a notification unit that notifies a user that an amount of carbon dioxide absorbed by the absorbent reaches a predetermined amount.

4. The carbon dioxide concentration control device according to claim 3,
wherein the notification unit is provided with an estimating mechanism that estimates the amount of carbon dioxide; absorbed by the absorbent based on an integrated operation time obtained by integrating the operation times of the control unit, and notifies the user that the amount of carbon dioxide absorbed by the absorbent reaches a predetermined amount in a case where the estimating mechanism estimates that the amount of carbon dioxide absorbed by the absorbent reaches a predetermined amount.

5. The carbon dioxide concentration control device according to claim 1, further comprising:
a notification unit that notifies a user that an absorbing rate of carbon dioxide absorbed by the absorbent is equal to or greater than a predetermined rate.

6. The carbon dioxide concentration control device according to claim 1, wherein the space is the inside of a compartment of an automobile.

7. An apparatus comprising the carbon dioxide concentration control device according to claim 1.

* * * * *